310-369

10/6/87 XR 4,698,644

United States Patent [19]

Drago et al.

[11] Patent Number: 4,698,644

[45] Date of Patent: Oct. 6, 1987

[54] DROP-ON-DEMAND INK JET PRINT HEAD

[75] Inventors: Gary A. Drago, Longmont, Colo.; Walter F. Baier; Francis C. Lee, both of San Jose, Calif.; Ross N. Mills, Boulder, Colo.; Horst G. Mossbrugger, San Jose, Calif.

[73] Assignee: International Business Machines, Armonk, N.Y.

[21] Appl. No.: 923,055

[22] Filed: Oct. 27, 1986

[51] Int. Cl.[4] .................... G01D 15/16

[52] U.S. Cl. .................... 346/140 R; 310/328; 310/369

[58] Field of Search .................... 346/140; 310/369, 328

[56] References Cited

U.S. PATENT DOCUMENTS

| | | | |
|---|---|---|---|
| 3,683,212 | 8/1972 | Zoltan | 310/8.3 |
| 4,357,061 | 11/1982 | Crosby | 339/17 |
| 4,390,886 | 6/1983 | Sultan | 346/140 |
| 4,402,562 | 9/1983 | Sado | 339/61 |
| 4,418,356 | 11/1983 | Reece | 346/140 |
| 4,430,594 | 2/1984 | Bork | 310/328 |
| 4,485,388 | 11/1984 | Sayko | 346/140 |
| 4,502,059 | 2/1985 | Blessington | 346/140 |
| 4,584,591 | 4/1986 | Kindler | 346/140 |
| 4,588,999 | 5/1986 | Depta et al. | 346/140 |

*Primary Examiner*—Joseph W. Hartary
*Attorney, Agent, or Firm*—Otto Schmid, Jr.

[57] ABSTRACT

An ink jet drop-on-demand print head comprises a plurality of tubular piezoelectric transducers each having two electrodes formed by an electrically conducting coating. A housing member holds the transducers in a position which includes at least one row of transducers. A substrate includes a plurality of electrical conductors, and the substrate is positioned so that each electrical conductor is adjacent one of the electrodes. A resilient connector means is provided which is not conductive along its length but is conductive across its width, and the connector means is positioned to make contact with a selected one of the electrical conductors and only one of the electrodes of one of the transducers. In a specific embodiment, the substrate comprises a flat conductor cable, and in a second embodiment the substrate comprises a printed circuit board.

17 Claims, 9 Drawing Figures

DROP-ON-DEMAND INK JET PRINT HEAD

FIELD OF THE INVENTION

This invention relates to ink jet printing apparatus, and more particularly, to multi-nozzle ink jet printing apparatus in which ink drops are generated on demand in response to suitable electrical signals.

DESCRIPTION OF THE PRIOR ART

There have been known in the prior art ink jet printing systems in which an electromechanical transducer is selectively energized to produce ink drops on demand. U.S. Pat. No. 3,683,212 to Zoltan, U.S. Pat. No. 4,390,886 to Sultan, and U.S. Pat. No. 4,418,356 to Reece, disclose an ink jet drop-on-demand print head in which the electromechanical transducer is a piezoelectric tube. The requirements for a higher print rate and a greater resolution in printing has led to multi-nozzle drop-on-demand ink jet arrays. These arrays require densely packed piezoelectric transducers to minimize the size and weight of the print head, and to enhance print visibility during printing operations. Due to the close proximity of the piezoelectric transducers, wiring for the electrodes on the piezoelectric tubes is extremely difficult. In addition, sealing at both ends of the piezoelectric transducer is particularly difficult since alignment, registration and centering of a large number of individual piezoelectric tubes is not easily accomplished. Conventional methods used in fabricating piezoelectric driver assemblies include standard lead soldering techniques on the electrodes and epoxy bonding materials at both ends of the piezoelectric elements. However, the prior art technique offers little flexibility for repair and replacement in case of broken parts either during fabrication of the print head or in later use. U.S. Pat. No. 4,584,591 to Kindler and U.S. Pat. No. 4,588,999 to Depta et al show an array of piezoelectric tubes which are clipped in place, soldered and incorporated into a molded assembly.

None of the prior art patents show an array of piezoelectric tubes which are "floating" inside a body member so that they are self-aligned and self-centered when the array is fixed in position between a manifold section and a fan-in section.

SUMMARY OF THE INVENTION

It is therefore the principal object of this invention to provide an ink jet drop-on-demand print head of modular design in which the array of piezoelectric transducers are properly aligned and centered when the array is fixed in position between a manifold section and a fan-in section.

According to the present invention, there is provided an ink jet drop-on-demand print head comprising a plurality of piezoelectric transducers each having first and second separate electrically conducting coating formed thereon to provide a first and a second electrode. A member is provided for holding the transducers in a spaced apart position and a substrate is provided which includes a plurality of spaced electrical conductors. The substrate is positioned adjacent a plurality of the transducers, and a resilient connector means is provided which is not electrically conductive along one dimension but is electrically conductive across its other dimension. The connector means is positioned to make electrical contact between one of the electrodes on said transducer and one of the electrical conductors on the substrate.

In a first embodiment the substrate comprises a flat cable conductor, and in a second embodiment the substrate comprises a printed circuit board.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

Figure 1:
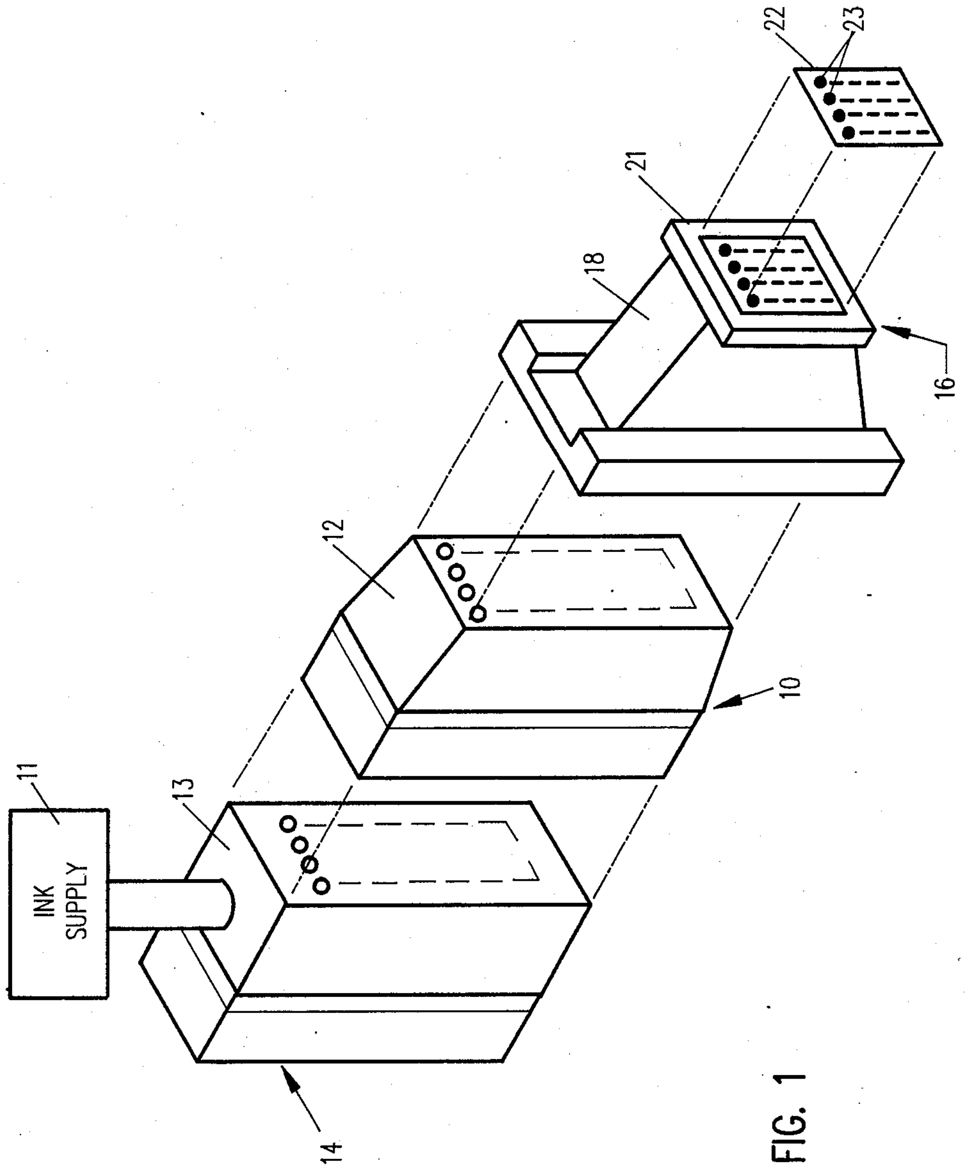
FIG. 1 is a perspective view of an ink jet drop-on-demand print head embodying the present invention.

The print head 10 comprises an actuator section 12 to which liquid ink is supplied from ink supply section 14. Actuator section 12 provides the driving force to eject drops of liquid ink from print element section 16. Fan-in section 18 provides ink channels which extend from the actuator section 12 to the print element section 16.

The present invention is directed to the actuator section 12, and this section will be described in detail after a brief description of the other components of the print head 10.

The ink supply section 14 comprises an ink supply means 11 which supplies a marking fluid such as liquid ink to manifold 13. Manifold 13 feeds the liquid ink to each of the transducers in actuator section 12, and a plurality of openings are provided to feed the liquid ink to a corresponding opening in the actuator section 12. A transducer tube gasket (not shown) is provided to seal the ink path between the ink supply section 14 and the actuator section 12 in fluid tight relation.

The fan-in section 18 comprises a plurality of ink channels, one end of which is positioned to mate with one of the transducers in actuator section 12, and this interface is maintained in fluid tight relation by a transducer tube gasket (not shown). As the ink channels move through the fan-in section toward the print element section, the spacing of the ink channels converges from the spacing of the transducers in actuator section 12 to the spacing of the orifices in print element section 16.

The print element section comprises an orifice plate substrate 21 into which is formed a plurality of openings in registration with the ink channels in fan-in section 18, and the interface is maintained in fluid tight relation by a gasket member (not shown). An orifice plate 22 which has a plurality of nozzles or orifices 23 in registration with the openings in orifice plate substrate 21. The orifice plate substrate 21 provides support for the fragile orifice plate 22, and the orifice plate 22 is permanently bonded to the orifice plate substrate 21. The diameter of each of the ink channels through the fan-in section 18, the gasket member 20, and the orifice plate substrate is chosen to provide a good acoustic impedance match in order to minimize reflections of the ejection pressure wave in each channel of the drop generator.

Figure 3:
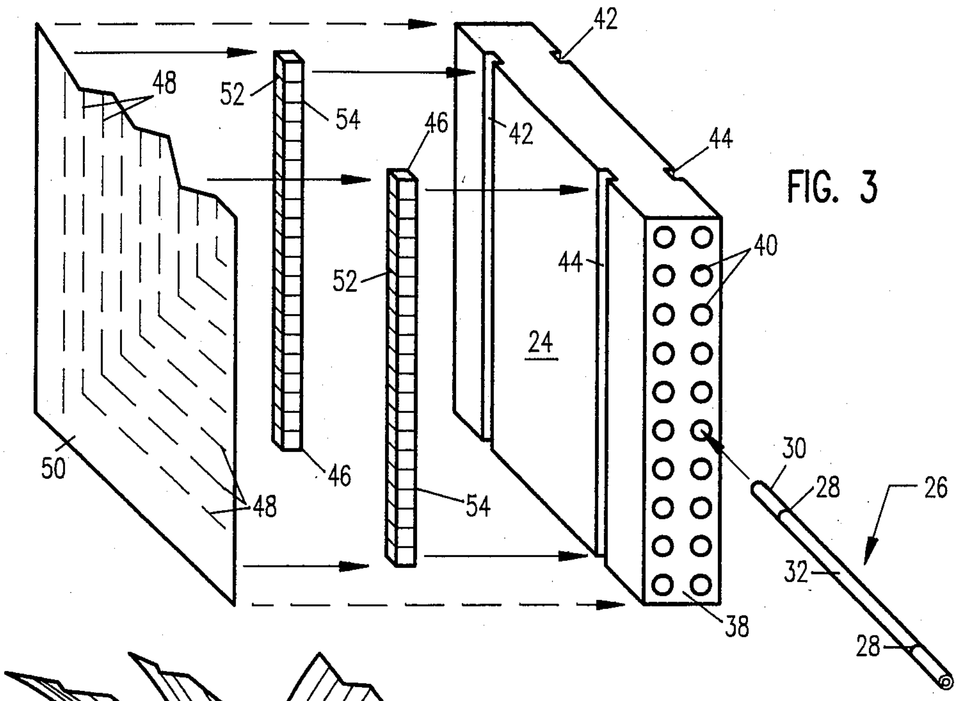
FIG. 3 is an exploded view of a part of the ink jet drop-on-demand print head of FIG. 2.

In the embodiment of the invention shown in the drawings, (FIGS. 2 and 3) actuator section 12 comprises a plurality of piezoelectric tubes 26 which are held in position by a tube housing member 24. Tube housing member 24 can be a molded plastic part, for example, and the housing comprises a plurality of openings into which the piezoelectric tubes 26 provide a close fit. The piezoelectric tubes 26 are coated, both inside and outside, with a conductive material that is resistant to corrosion by the liquid ink. Near each end of the tube 26 a ring 28 is formed on the outside of the tube so that no conductive material is present in the ring area. The ring 28 has the effect of producing two electrodes on the tube. The first electrode 30 is formed on the inside of the tube, around the ends of the tube, and on the outside of the tube near the ends of the tube. The second electrode 32 is produced on the center portion of the outside of the tube between the two rings 28. The first electrode 30 is connected to a reference potential and the second electrode 32 carries the drive signal for each of the piezoelectric tubes 26. The active portion of the tube 26 is the center portion, that is, the portion between the two rings 28. When an electric pulse is applied to the center portion electrode 32 of a piezoelectric tube 26, the tube momentarily contracts and generates a pressure wave in the ink inside the tube. A portion of this pressure wave travels forward in the channel from the center portion of the tube 26 and the forward traveling wave causes the ejection of a drop of ink from the corresponding orifice 23 when the pressure wave reaches the print element section 16.

Figure 2:
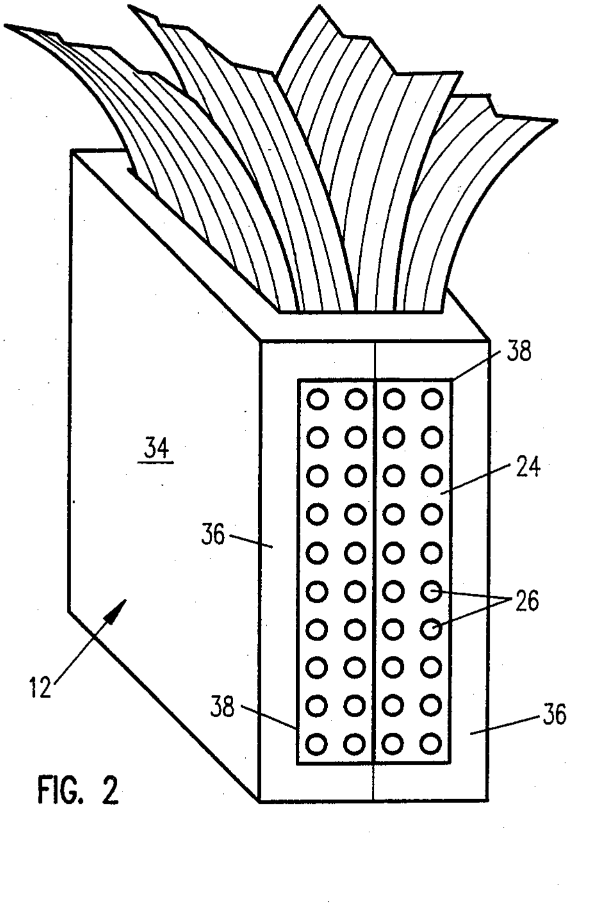
FIG. 2 is a perspective view of a specific embodiment of the ink jet drop-on-demand print head of the present invention.

In the embodiment of the print head shown in FIG. 2, the actuator section 12 is divided into two symmetrical halves. The actuator section 12 comprises a supporting frame 34 having two identical halves 36 fastened together and two identical modules 38 of piezoelectric tubes 26. The modular block 38 (FIG. 3) is made of an inexpensive, non-conductive material such as plastic with two columns each having a selected number of holes 40 through its entire length. These holes 40 are made just large enough for free insertion of the piezoelectric tubes 26. Two slots 42, 44 are provided on each side of the blocks 38 to expose the signal electrodes 32 and the reference electrodes 30 of the piezoelectric tubes 26. Electrical connector means 46 are provided to connect a particular signal electrode 32 to a corresponding electrical conductor 48 on flat cable conductor 50. Electrical conductor means 46 comprises a resilient body member 52 which is non-conductive and which has conductive rings 54 at spaced intervals so that electrical contact is made between one of the conductors 48 and one of the electrodes 30 or 32 of the piezoelectric transducers 26.

Figure 4:
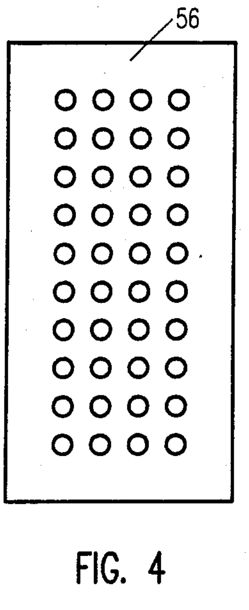
FIG. 4 is a plan view of a flat gasket member.

The completed actuator seotion 12 is then fastened to the ink supply section 14 and the fan-in section 18 by suitable screws, clamps or clips. A flat gasket member 56 (FIG. 4) having openings corresponding to holes 40 is placed on each end of the actuator section 12. The control signals to produce the desired printed data are coupled to corresponding ones of conductors 48.

The print head design has many advantages both in fabrication and in operation. The design permits easy repair and replacement of all the components of the print head either at the time of fabrication or in later operation of the print head. No soldering is required for electrical contact, and no epoxy or other bonding material is needed to hold the piezoelectric tubes in position since the piezoelectric tubes 26 are essentially floating inside the modular block 38 and are self-aligned and self-centered when the actuator section 12 is fastened in place between the ink supply section 14 and the fan-in section 18.

Figure 5:
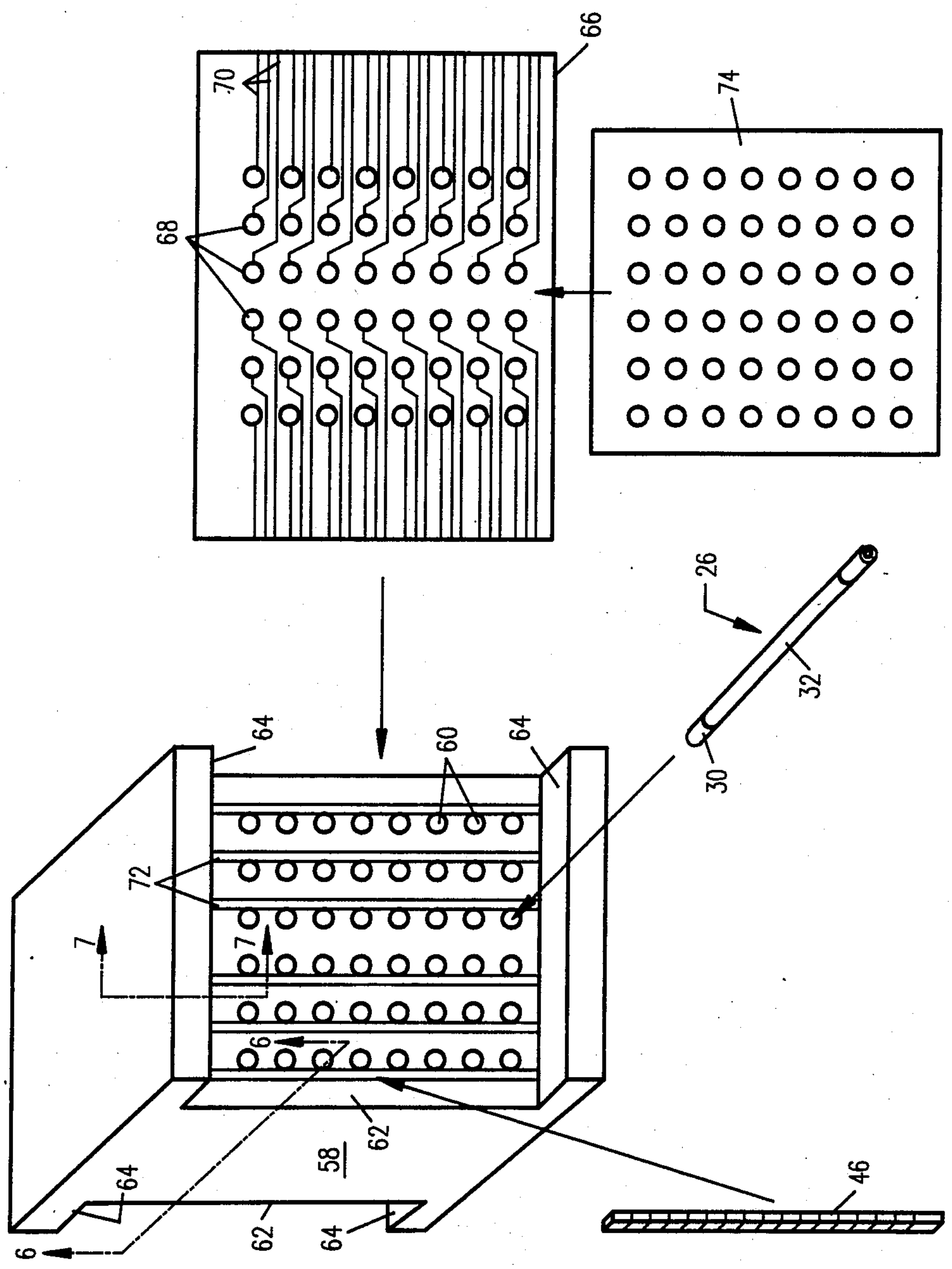
FIG. 5 is an exploded view of an alternate embodiment of the ink jet drop-on-demand print head of the present invention.
Figure 7:
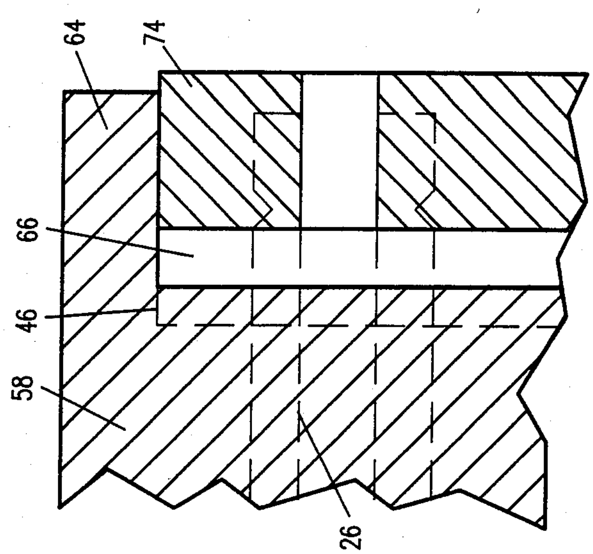
FIG. 7 is a partial section view taken along line 7—7 of FIG. 5.
Figure 6:
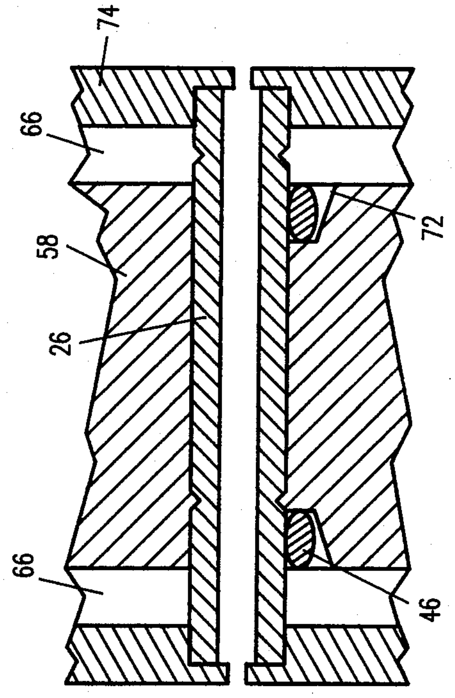
FIG. 6 is a partial section view taken along line 6—6 of FIG. 5.

As the number of modules required for a high resolution print head increases, the embodiment of the invention shown in FIGS. 5–7 makes it easier to retain the relative registration among modules. The print head is shown in an exploded view in FIG. 5, and the print head comprises a body member 58 having a plurality of holes 60 which are arranged in a plurality of rows and extend through the entire body member 58. A recess 62 is provided in each end of body member 58 in the face normal to holes 60 to provide a step overhang 64. A printed circuit board 66 is provided with a plurality of holes 68 having the same spacing as holes 60 in body member 58. An electrical conductor 70 is provided on the printed circuit board 66 which extends from one of the holes 68 to the edge of the printed circuit board 66. Piezoelectric tubes 26 are inserted in each of the holes 60 in body member 58, and the ends of the piezoelectric tubes 6 are inserted through one of the holes 68, in the printed circuit board 66. Gasket member 74 has a corresponding plurality of holes and the ends of the piezoelectric tubes 26 are also inserted partially through one of the holes in gasket member 74. One slot 72 is provided along each row of holes 60 within the recessed face of body member 58. When the actuator section is assembled, as shown in FIG. 6, an electrical conductor means 46 is positioned within each slot 72 to make electrical contact between one of the electrodes 30, 32 on piezoelectric tube 26 and the corresponding one of the conductors 70 on printed circuit board 66. As shown in FIG. 7, the step overhangs 64 on top and bottom of body member 58 provide a positive stop when the actuator section 12 is clamped between the manifold section 14 and the fan-in section 18, thereby preventing overcompression of the gasket members 74.

Figure 8:
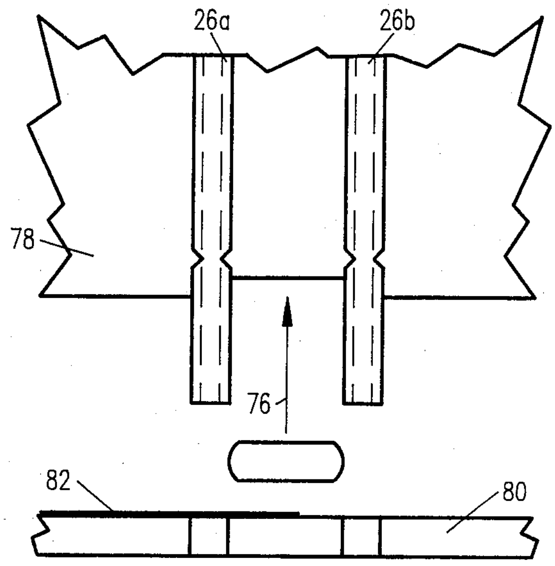
FIG. 8 is a partial exploded view of a further embodiment of the ink jet drop-on-demand print head of the present invention.
Figure 9:
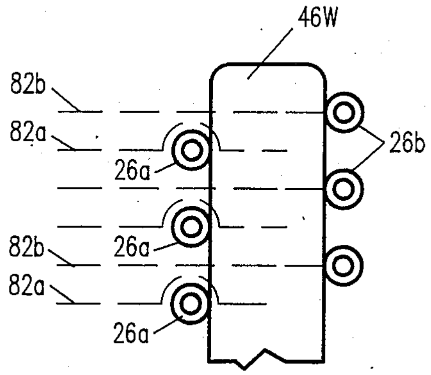
FIG. 9 is a partial front view of the ink jet drop-on-demand print head of FIG. 8.

In the embodiment shown in FIGS. 5–7, one slot and one conductor means for each column of piezoelectric tubes is needed. However, in the further embodiment of the invention shown in FIGS. 8 and 9, two adjacent columns of piezoelectric tubes can utilize one slot and one conductor means. As shown in FIG. 9, the piezoelectric tubes 26 in adjacent columns are staggered, and a slot 76 is cut in body member 78 which extends between two adjacent columns of piezoelectric tubes *26a* and *26b*. A conductor means *46w* is provided which has the size and shape, when placed in slot 76, to make electrical contact with one of the electrodes 30, 32 on piezoelectric tubes *26a* or *26b* and the corresponding one of the conductors *82a* or *82b* on printed circuit board 80. In other respects this embodiment is similar to that shown in FIGS. 5–7.

Several embodiments of the invention have been described, each of which has the advantage of modular design, and fabrication advantages which include no soldering operation and no bonding operation. The print head is repairable should one or more components require replacement. The modular design also offers additional advantages in terms of piezoelectric tube registration and alignment.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. An ink jet drop-on-demand print head comprising:

a plurality of tubular piezoelectric transducers each having a first and a second separate electrically conducting coating formed thereon;

a mounting member for holding said transducers in a spaced apart position;

a substrate having a conductor pattern including a plurality of separate electrical conductors thereon and means for mounting said substrate in a fixed position adjacent a plurality of said transducers;

a resilient connector means that is not electrically conductive along one dimension but is electrically conductive across other dimension; and means for positioning said connector means in a fixed position relative to said transducers and said substrate so that an electrical oonnection is made between one of said conductive coating on each of said plurality of transducers and one of the circuit patterns on said substrate so that each of said transducers can be selectively energized to produce one drop of ink each time the transducer is energized.

2. The ink jet drop-on-demand print head of claim 1 wherein said substrate having a conductor pattern comprises a flat conductor cable.

3. The ink jet drop-on-demand print head of claim 1 wherein said substrate having a conductor pattern comprises a printed circuit board.

4. The ink jet drop-on-demand print head of claim 1 wherein said connector means comprises an elongated resilient electrically non-conductive body member having conductor bands thereon spaced at predetermined spacing.

5. An ink jet drop-on-demand print-head comprising:

a plurality of tubular piezoelectric transducers each having a first and a second separate electrically conducting coating formed thereon;

a housing member for holding said transducers in a spaced apart position; said housing member having a plurality of tube holding cavities therein arranged in at least one group;

a substrate having a conductor pattern including a plurality of separate electrical conductors thereon and means for mounting said substrate in a fixed position adjacent said group of said transducers;

a resilient connector means that is not electrically conductive along one dimension but is electrically conductive across other dimension; and means for positioning said connector means in a fixed position relative to said transducers and said substrate so that an electrical connection is made between one of said conductive coating on each of said plurality of transducers and one of the circuit patterns on said substrate so that each of said transducers can be selectively energized to produce one drop of ink each time the transducer is energized.

6. The ink jet drop-on-demand print head of claim 5 wherein said substrate having a conductor pattern comprises a flat conductor cable.

7. The ink jet drop-on-demand print head of claim 5 wherein said group of transducers comprises a linear row.

8. The ink jet drop-on-demand print head of claim 7 wherein said means for positioning said connector means in a fixed position comprises a slot formed in said housing member which extends into each of the tube holding cavities which hold transducers forming said group of transducers.

9. The ink jet drop-on-demand print head of claim 8 wherein said connector means comprises an elongated resilient electrically non-conductive body member having conductor bands thereon spaced at spacings which enable electrical contact between one of said electrical conductors and a selected one of the electrically conductive coating formed on one of said transducers.

10. The ink jet drop-on-demand print head of claim 9 wherein said electrical conductors and said electrically conductive coating make electrical contact with opposite faces of said conductor band.

11. An ink jet drop-on-demand print head comprising: a plurality of tubular piezoelectric transducers each having a first and a second separate electrically conducting coating formed thereon;

a housing member for holding said transducers in a spaced apart position; said housing member having a plurality of tube holding cavities therein arranged in a plurality of groups;

a substrate having a conductor pattern including a plurality of separate electrical conductors thereon and means for mounting said substrate in a fixed position adjacent to at least one of said plurality of groups of said transducers;

a elongated resilient connector means that is not electrically conductive along one dimension but is electrically conductive across other dimension; and means for positioning said connector means in a fixed position relative to said transducers and said substrate so that an electrical connection is made between one of said conductive coating on each of said plurality of transducers and one of the circuit patterns on said substrate so that each of said transducers can be selectively energized to produce one drop of ink each time the transducer is energized.

12. The ink jet drop-on-demand print head of claim 11 wherein said substrate having a conductor pattern comprises a printed circuit board.

13. The ink jet drop-on-demand print head of claim 12 wherein said printed circuit board has a plurality of openings through which one end of each of said transducers pass in mounting said substrate in a fixed position adjacent to said group of transducers.

14. The ink jet drop-on-demand print head of claim 12 additionally comprising:

sealing gasket means positioned at each end of said housing member;

said housing member having an overhang portion at each end so that said sealing gaskets are not overcompressed when said housing member is assembled with a further component of said print head.

15. The ink jet drop-on-demand print head of claim 11 wherein said plurality of groups of transducers each comprise a linear row of transducers.

16. The ink jet drop-on-demand print head of claim 15 wherein said connector means comprises an elongated resilient electrically non-conductive body member having conductor bands thereon spaced at spacings which enable electrical contact between one of said electrical conductors and a selected one of the electrically conductive coating formed on one of said transducers.

17. The ink jet drop-on-demand print head of claim 15 wherein a single connector means is positioned to make electrical contact between said electrical conductors and two of said plurality of rows of transducers.

* * * * *